(12) United States Patent
Sarigul-Klijn et al.

(10) Patent No.: US 10,040,549 B2
(45) Date of Patent: Aug. 7, 2018

(54) SINGLE USE LOGISTIC GLIDER

(71) Applicants: Martinus M. Sarigul-Klijn, Dixon, CA (US); Maurice P. Gionfriddo, Dixon, CA (US); Nesrin Sarigul-Klijn, Dixon, CA (US)

(72) Inventors: Martinus M. Sarigul-Klijn, Dixon, CA (US); Maurice P. Gionfriddo, Dixon, CA (US); Nesrin Sarigul-Klijn, Dixon, CA (US)

(73) Assignee: Logistic Gliders Inc., Dixon, CA (US)

( * ) Notice: Subject to any disclaimer, the term of this patent is extended or adjusted under 35 U.S.C. 154(b) by 0 days.

(21) Appl. No.: 15/715,016

(22) Filed: Sep. 25, 2017

(65) Prior Publication Data

US 2018/0086449 A1    Mar. 29, 2018

Related U.S. Application Data

(60) Provisional application No. 62/400,527, filed on Sep. 27, 2016.

(51) Int. Cl.
*B64C 31/02* (2006.01)
*F42B 10/00* (2006.01)
(Continued)

(52) U.S. Cl.
CPC ............ *B64C 31/02* (2013.01); *B64C 3/185* (2013.01); *B64C 3/56* (2013.01); *B64C 25/52* (2013.01); *B64D 17/80* (2013.01)

(58) Field of Classification Search
CPC .......... B64C 3/185; B64C 3/56; B64C 31/02; B64C 3301/102; F42B 10/14; F42B 10/20
See application file for complete search history.

(56) References Cited

U.S. PATENT DOCUMENTS 1,998,148 A * 4/1935 Vieriu .................. B64C 3/56
                                                 244/49
2,507,957 A    5/1950 Carlson
(Continued)

OTHER PUBLICATIONS

"The Installation and Use of Piano Hinges," Tony Bingelis, https://www.eaa.org/en/eaa/aviation-communities-and-interests/homebuilt-aircraft-and-homebuilt-aircraft-kits/resources-for-while-youre-building/building-articles/cowlings/the-installation-and-use-of-piano-hinges, downloaded Nov. 29, 2016.
(Continued)

*Primary Examiner* — Philip J Bonzell
(74) *Attorney, Agent, or Firm* — Stiennon & Stiennon (57) ABSTRACT

A disposable airdropped glider. The glider body is constructed from precut panels cut from (MDO) or (HDO) plywood and assembled with pocket-screw joinery or piano hinges. A skid board forms a landing surface and a cargo deck roll-off surface. The glider has pivoting wings and struts. The glider has a triple-tail, a flat nose and honeycomb paperboard panels between the nose and the cargo. Wings are pivoted from a position overlying the fuselage to a flying position by gas springs in wing spars which are compressed by a chain attached to the fuselage through a rotating bracket such that the gas springs are compressed when the wings are folded. The airfoils are plastic extrusions with openings that hold the wing spars and co-formed jury spars which attach the upper and lower surface of the wing. A parachute uses a part of the tail structure to form a deployment drogue.

8 Claims, 8 Drawing Sheets

(51) Int. Cl.
  *B64C 3/18* (2006.01)
  *B64D 17/80* (2006.01)
  *B64C 25/52* (2006.01)
  *B64C 3/56* (2006.01)

(56) References Cited

U.S. PATENT DOCUMENTS

| | | |
|---|---|---|
| 4,535,958 A | 8/1985 | Hutchinson |
| 5,474,257 A | 12/1995 | Fisher et al. |
| 5,671,899 A * | 9/1997 | Nicholas .................. B64C 3/40 244/3.28 |
| 5,878,979 A | 3/1999 | Fisher et al. |
| 5,884,863 A | 3/1999 | Fisher et al. |
| 6,283,409 B1 | 9/2001 | Dam |
| 6,978,970 B2 * | 12/2005 | Purcell, Jr. ................ B64C 3/56 244/49 |
| 6,986,481 B2 | 1/2006 | Fanucci et al. |
| 7,059,566 B2 | 6/2006 | Byers et al. |
| 7,338,010 B2 * | 3/2008 | Corder ..................... B64C 3/56 244/3.24 |
| D651,156 S | 12/2011 | Gundlach |
| 8,939,056 B1 | 1/2015 | Neal, III et al. |
| 2007/0018033 A1 | 1/2007 | Fanucci et al. |
| 2013/0048787 A1 | 2/2013 | Riley et al. |
| 2017/0001724 A1 * | 1/2017 | Yates ..................... B64C 39/024 |
| 2017/0283035 A1 * | 10/2017 | Ji ........................... B64C 3/546 |
| 2017/0291686 A1 * | 10/2017 | Alley ....................... B64C 5/12 |
| 2017/0369150 A1 * | 12/2017 | Finklea ..................... B64C 3/56 |

OTHER PUBLICATIONS

Graham Warwick, "Longer Lifeline," Aviation Week & Space Technology, May 27, 2013, p. 17.
Keith M. Thoms, "Interim Heavy Airlift: Sea Base Logistics Glider Concept," NSWCDD/TR-06/52, Jan. 2007.
Y. Klein, I. Gelman, V. Tokarev, G. Frieger, Y. Levy, U. Hod, B. Meivar, Faculty of Aerospace Engineering, Technion-Israel Institute of Technology, "Ghost Glider—Long Range Autonomous Airdrop System," http://aerospace.technion.ac.il/projects/ghost-glider/, downloaded Oct. 22, 2016.
Piero Morelli and Giulio Romeo, "Experimental Investigation into the Feasibility of an 'Extruded' Wing," Politecnico di Torino, Italy, N79-27077.
Piero Morelli, "Extruded Light Alloy Aircraft Structures," Technical Soaring, vol. II, No. 2, Oct. 1972, p. 14.
Model Image 1, applicant's admitted prior art, logisticgliders.com, Mar. 2012.
Model Image 2, applicant's admitted prior art, logisticgliders.com, Mar. 2012.
Model Image 3, applicant's admitted prior art, logisticgliders.com, Mar. 2012.
Streamline Fairings, http://www.uflyit.com/streamline_fairings.htm, downloaded Sep. 21, 2017.
Theo W. Knacke, Parachute Recovery Systems Design Manual, NWC TP 6575, Mar. 1991.

* cited by examiner

SINGLE USE LOGISTIC GLIDER

CROSS REFERENCES TO RELATED APPLICATIONS

This application claims priority on U.S. Provisional Application No. 62/400,527 filed Sep. 27, 2016, which is incorporated by reference herein.

STATEMENT AS TO RIGHTS TO INVENTIONS MADE UNDER FEDERALLY SPONSORED RESEARCH AND DEVELOPMENT

This invention was made with government support under contract number D16PC0011 awarded by DARPA. The government has certain rights in the invention.

BACKGROUND OF THE INVENTION

The present invention relates to the resupply or delivery of payload by airdrop or gliders.

In tactical combat defending a hardened position, or engaging the enemy behind their lines has considerable tactical advantage. In the defense of a hardened position the defenders are considerably less exposed to fire than the attackers and thus can withstand a superior enemy. Further, if the enemy cannot reduce such a hard position and bypasses the position, it leaves an active fighting force in its rear, which either ties down considerable enemy forces, or leaves the defenders capable of conducting sorties to cut supply lines and to conduct attacks from the rear. Similarly, troops operating behind enemy lines have a tactical advantage including the element of surprise and the relatively soft targets presented by lines of communication and supply depots. However, both these tactical advantages depend on an ability to resupply behind enemy lines or through superior forces.

Where air superiority is maintained, resupply by air is possible. However, conventional approaches can often deliver the supplies to the enemy or subject valuable and limited assets to enemy fire. What is needed is a method of air resupply which is highly accurate, low cost, and can be delivered without overflying or landing where the enemy can effectively attack the supplying aircraft.

SUMMARY OF THE INVENTION

The air resupply device of this invention is a disposable glider of low cost which can be dropped from an aircraft and glide to a landing point up to 130 statue miles from the drop point, depending on the altitude at which the airplane is dropped. The glider body is constructed from precut panels cut from medium density overlay (MDO) plywood which resists water, weather, wear and degradation. High density overlay (HDO) plywood with a more rugged, smoother surface can also be used. The plywood panels are joined with one inch self-tapping pocket hole screws which form a high-strength connection between the panels. Pocket-screw joinery involves drilling a hole at an angle e.g., 15 degrees into one workpiece, and then joining it to a second workpiece with a self-tapping screw. Pocket screws require only one side of a joint to be drilled, which can be done on automatic equipment. The pieces are joined with glue such as Titebond® III and self-tapping pocket hole screws which form their own hole in the second workpiece. Using pocket hole screws eliminates the need to access the inside of the joint, allowing the cargo space in the fuselage to be closed from the exterior.

Assembly of the glider begins with a rectangular skid board which forms a surface on which the glider can roll off the cargo deck of a drop aircraft. The glider is formed as a long narrow rectangular plywood box or fuselage mounted to the skid board, to which is attached two wings and a triple-tail. A blunt picture frame nose of concrete containing an energy absorbing material is attached to a forward frame which forms the forward end of the fuselage. Two sides of the box extend rearward of the forward frame past an aft frame where the sides converge, coming together to form a tail structure. Portions of the side extending to a point form a slot in which the horizontal stabilizer is mounted. The triple-tail having three vertical stabilizers is formed by two outboard fins mounted to the ends of the horizontal stabilizer and a third fin is mounted between the outboard fins along the principal axis of the fuselage. One of the outboard fins supports a rudder and the horizontal stabilizer mounts a port and starboard elevator.

The glider has two mirrored wings having wing spars which are mounted to the fuselage by a pivot pin, and a wing strut. The wing struts are pivotally mounted to the ends of a metal strap which spans the fuselage between the skid board and the fuselage and forms a support loop below the center of gravity (CG) of the glider. The wing and the struts are pivoted from a storage and launch position where the wings overlie the fuselage, to a flying position by a pair of gas springs in each wing spar which are compressed through a chain attached to the fuselage through a rotating bracket such that the gas springs are compressed when the wings are folded. The wings need not be locked open, rather, the gas springs provide both the deployment force and the force to keep the wings in the deployed position. The wings and the horizontal stabilizer are cut from an ABS plastic extrusion which forms the wing surfaces. The wing extrusion as formed, has a rectangular walled opening that holds the wing spar; the extrusion also has a plurality of jury spars which attach the upper and lower surface of the wing.

The aft bulkhead and the tail form a pyramidal frustum shaped space in which a downwardly opening drawer is mounted. A terminal landing parachute such as a Low Cost Low Velocity Parachute (LCLV) is stored in the drawer and arranged such that when the drawer is released from the glider the drawer forms a drogue which extracts the parachute such that it rapidly and reliably inflates. The drawer is mounted to open downwardly so it detachably rotates about the aft most edge which holds the drawer to the tail. The front of the drawer is releasable by an actuator mounted to the aft frame such that the leading edge of the bottom of the drawer, which forms the lower skin of the tail, when released rotates into the slip stream of the glider and is pulled open and falls away and acts as a drogue which pulls the landing parachute out from the glider. The parachute can be deployed to land the glider vertically on its nose in forested or urban terrain as well as small clearings.

It is an object of this invention to provide an expendable logistic delivery glider which provides for air drops with a standoff of over 130 statue miles.

It is another object of this invention to provide an expendable logistic delivery glider which is low cost.

It is another object of this invention to provide an expendable logistic delivery glider which deploys a terminal landing parachute so it can be used in forested or urban terrain as well as small clearings.

Further objects, features and advantages of the invention will be apparent from the following detailed description when taken in conjunction with the accompanying drawings.

DESCRIPTION OF THE PREFERRED EMBODIMENTS

Figure 1:
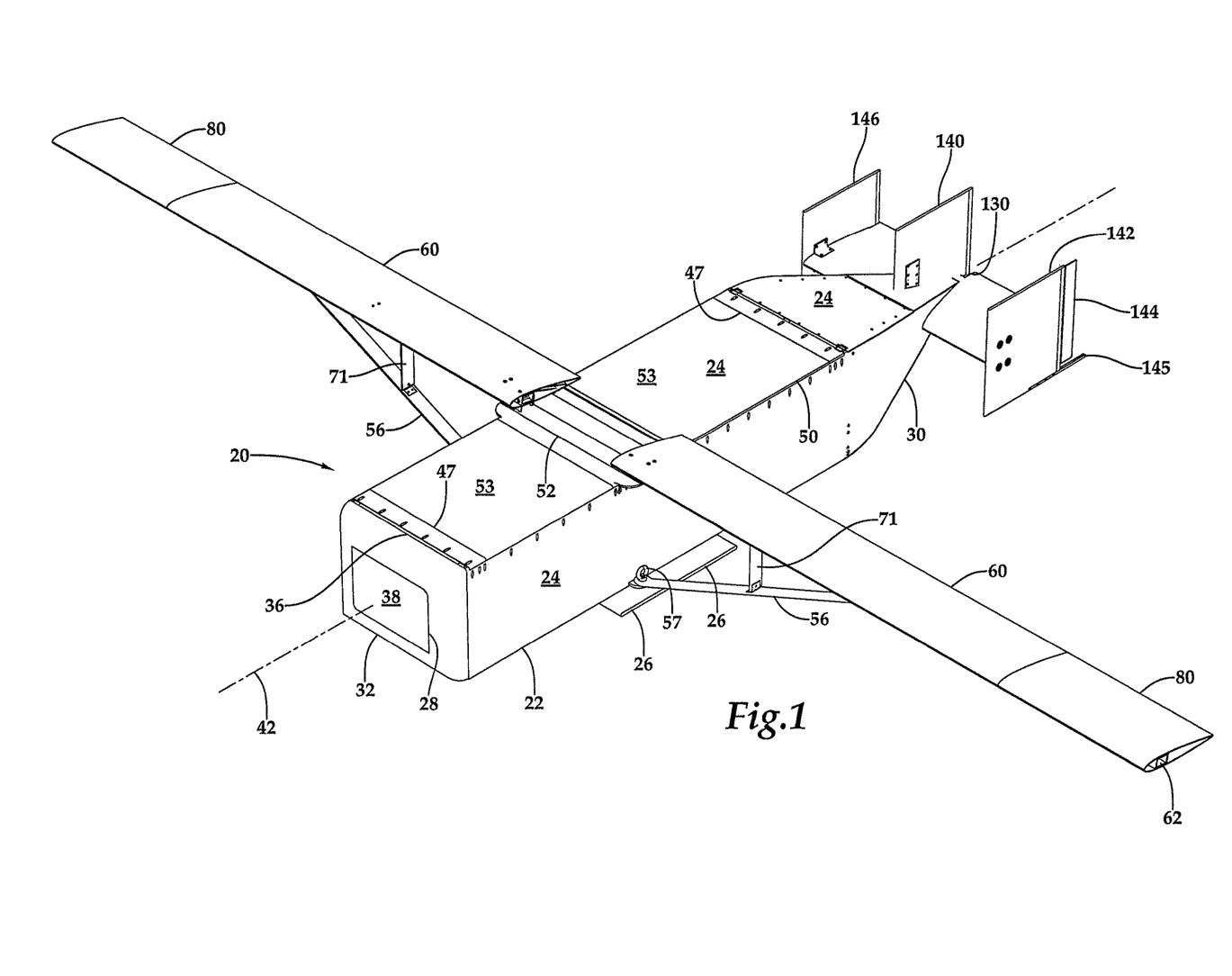
FIG. 1 is an isometric view of the logistic glider of this invention.
Figure 2:
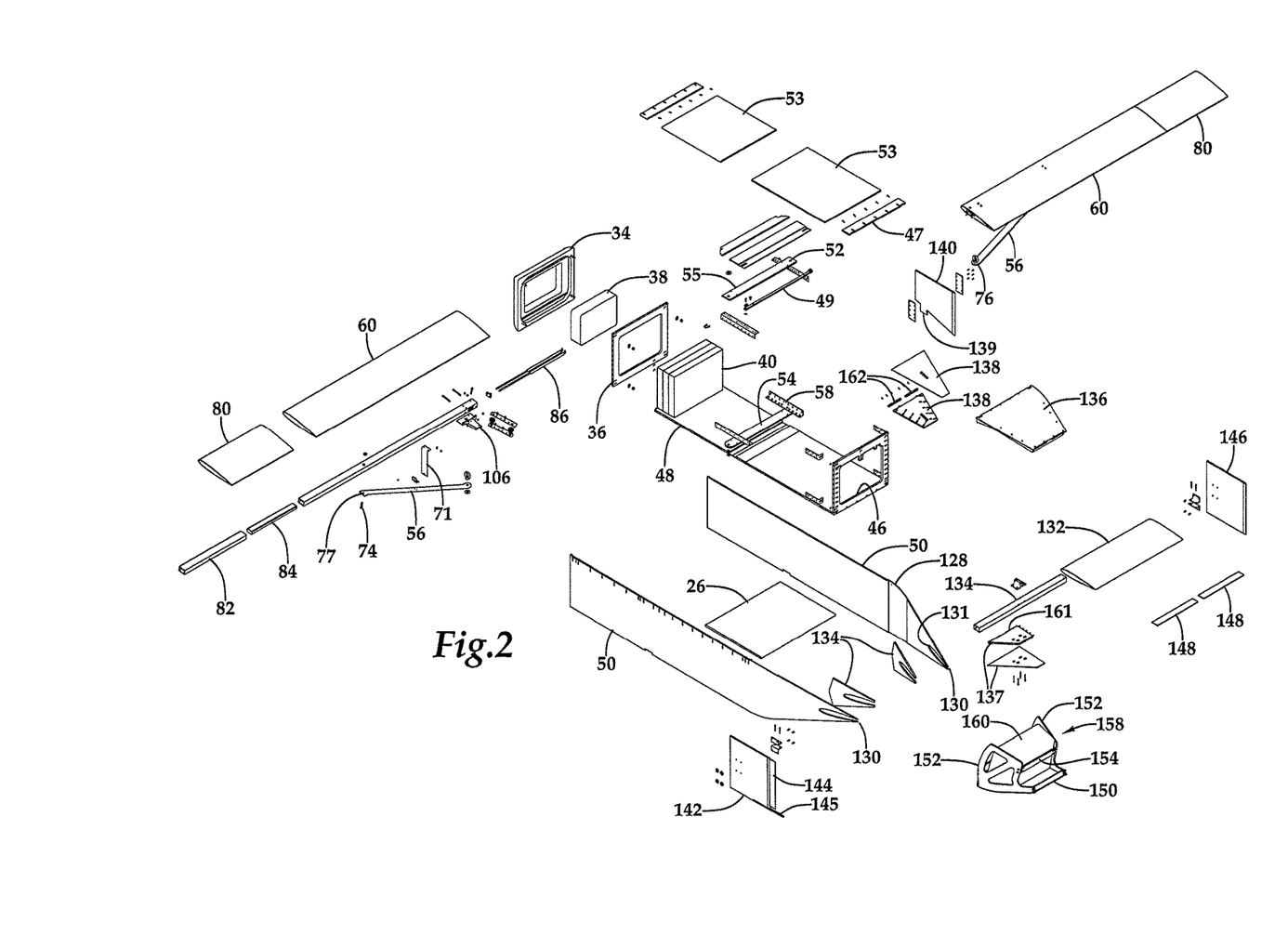
FIG. 2 is a partly exploded isometric view of the logistic glider of FIG. 1.

Referring more particularly to FIGS. 1-8, the logistic glider 20 is shown in FIG. 1. The glider 20 is constructed of low cost materials and for ease of assembly such that no part of the glider need be recovered for reuse. The fuselage 22 of the glider 20 is constructed as a rectangular box formed of medium or high density overlay plywood panels 24. This type of plywood is also known as signboard; it is impregnated with a resin which produces a smooth water resistant surface but has a cost not significantly greater than that of ordinary structural plywood. As shown in FIG. 2 the fuselage begins with a skid board 26 which forms the lowermost structure which is attached to the fuselage proper. The skid board 26 forms a launch skid which remains with the glider 20 after it is airdropped from a cargo aircraft used to deploy the glider. The skid board obviates the need for any component other than the logistic glider 20 from being dropped from the aircraft as part of the deployment process. This is an important consideration because any object falling from the aircraft represents a hazard to persons on the ground, and therefore extraneous structures being dropped are to be avoided.

Figures 2A, 3:
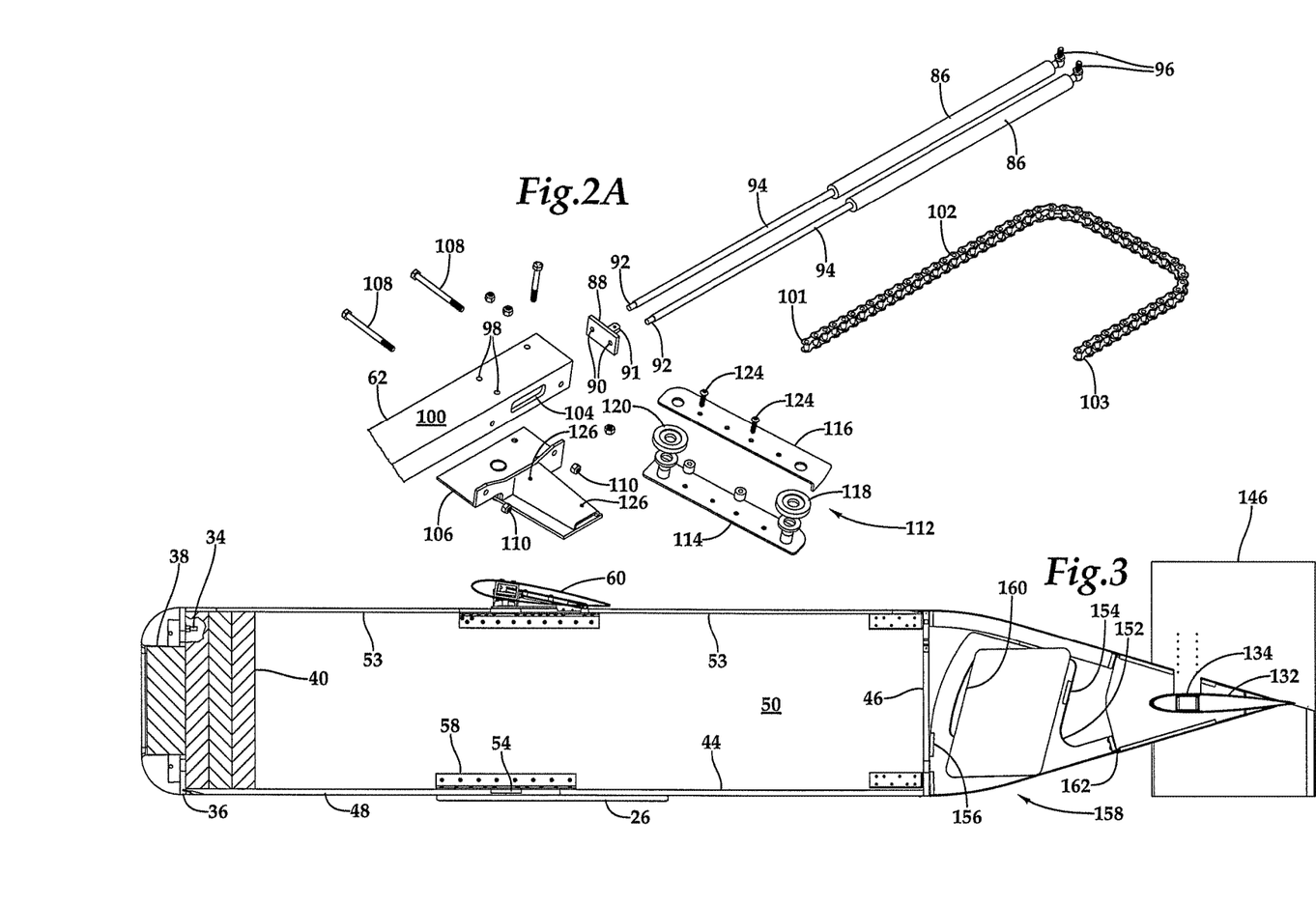
FIG. 2A is an enlarged isometric exploded view of a detail of the logistic glider shown in FIG. 2.
FIG. 3 is a cross-sectional view of the logistic glider of FIG. 1.
Figure 6:
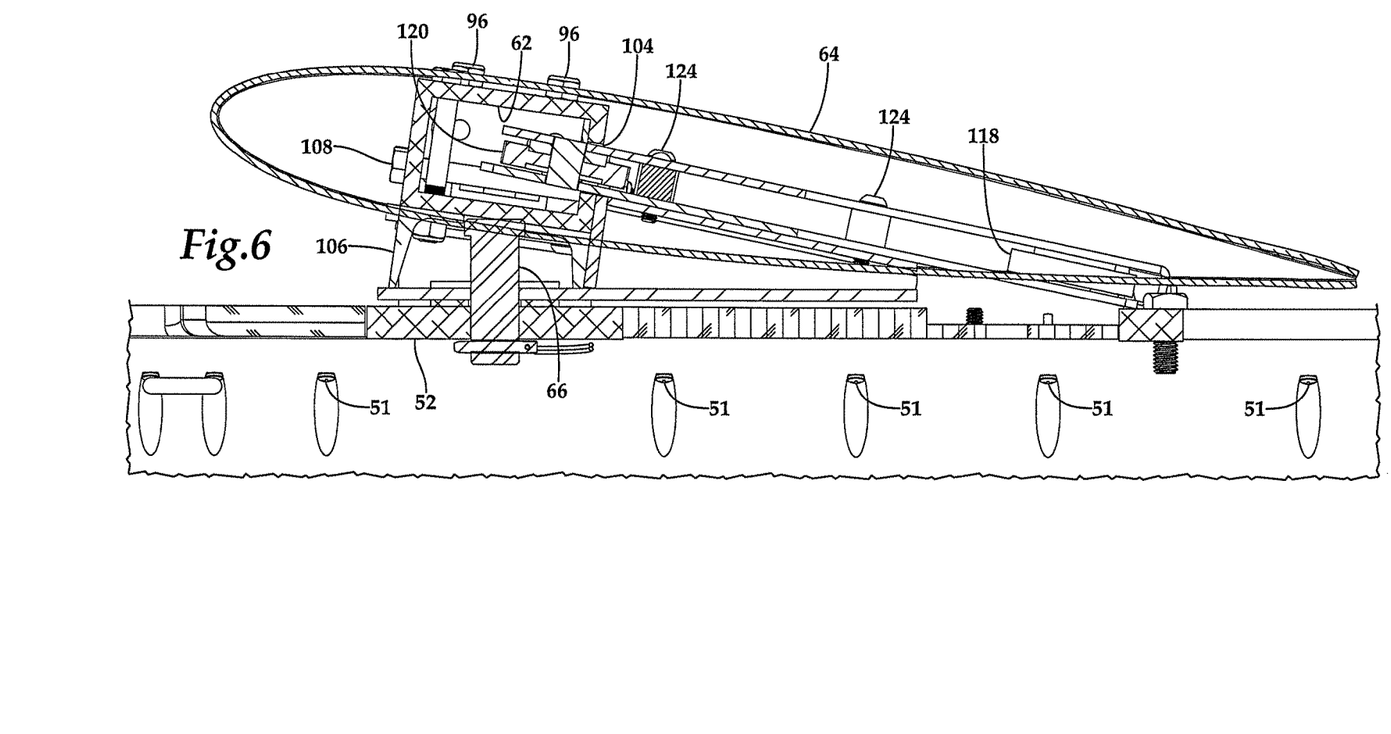
FIG. 6 is a partial side elevational, cross-sectional view of the wing deployment mechanism positioned on the fuselage bridging wing spar, all of the logistic glider of FIG. 1.

The main body of the fuselage 22 as shown in FIG. 1 comprises: beginning with the nose 28 and extending to the tail 30: a nose frame 32 constructed of cast concrete which supports the logistic glider 20 when gliders are stored vertically, either in forward or rear logistics depot, a deployment sling, or during shipping. The nose frame 32 has an internal steel frame parts of which form four threaded bolts 34 which serve to attach the nose frame 32 to the forward structural frame 36. The central opening of the frame is filled with a first portion 38 of energy absorbing material such as paper honeycomb or aluminum honeycomb bonded to face sheets. The energy absorbing material, when subjected to high loads, crushes and therefore absorbs energy through the work performed in deforming of a honeycomb structure. A second and larger portion 40 of energy absorbing material, extending 9 inches along the fuselage body axis 42 forms the forward end and extends to the top of cargo bay 44 as shown in FIG. 3 which holds the payload which is delivered by the logistic glider 20. The cargo bay 44 extends between the forward frame 36 and aft frame 46 wherein the forwardmost section of the cargo bay is occupied by the energy absorbing material 40. The cargo bay 44 is further defined as shown in FIG. 2 by a floor panel 48, two side panels 50 which are joined to each other and the frames 36, 46 by pocket screws 51 as shown in FIG. 6. A fuselage bridging wing spar 52 is composed of an aluminum spar 55 to which the pivot shaft 66 of a pivot bracket 106 is mounted and an anchor bar 49 to which the anchor block 126 is mounted and several stifling members. Two upper closeout panels 53 enclose the cargo bay 44 on either side of the bridging wing spar 52. Anti-racking bars 47 are screwed to the forward frame and the rear frame 46 as shown in FIG. 1.

As shown in FIG. 2, mounted to the interior surface of the floor panel 48 is an aluminum load transfer strap 54 to which two wing struts 56 are pivotally mounted with bolts 57. The side panels 50 attachment to the floor panel 48 is reinforced where the load strap 54 penetrates the sidewalls by aluminum L-channels 58 with holes for fasteners. L-channels are also used to strengthen the fuselage bridging wing spar 52 and the aft frame 46. The load path between the payload and the wings 60 principally passes through the wing struts 56, which in combination with the load strap 54 forms a cradle which approximately underlies the center of gravity of the fuselage and the contained payload. L-channels 58 are attached and positioned so as to distribute this load path into the floor panel 48 and the side panels 50.

Figure 5:
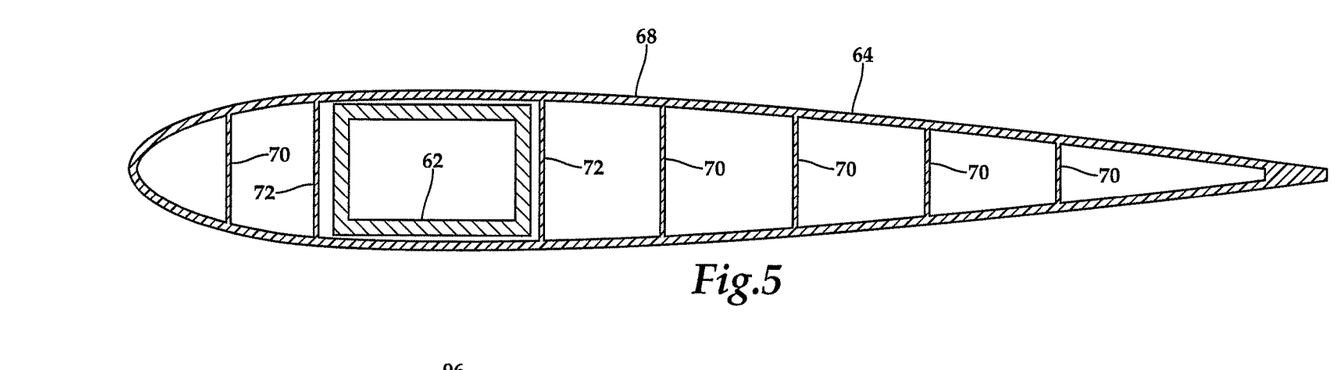
FIG. 5 is a cross-sectional view of an extruded wing section and a wing spar to which the wing section is mounted to the logistic glider of FIG. 1.

The wings of the logistic glider 20 are constructed of an aluminum wing spar 62 formed by an aluminum rectangular extrusion which supports a wing profile made from an ABS plastic extrusion 64 as shown in FIG. 5. The wing spar 62 is pivotally mounted to the fuselage bridge spar 52 at an angle of attack of 8° by a pivot shaft 66 shown in FIG. 6. The wing extrusion 64 structurally supports the aerodynamic lift surfaces 68 and which together with the remaining structures provide a 16:1 lift to drag (glide) ratio. The lift to drag (glide) ratio can be increased by a longer wing extension 80 to 20:1. The aerodynamic lift surfaces 68 have a thickness of approximately 0.12 inches and have wing wise ABS jury spars 70 with a thickness of approximately 0.06 inches. The wing extrusion 64 is formed without sink marks i.e. imperfection of the lifting surfaces due to the contraction of the plastic overlying the jury spars, to form smooth lift surfaces 68. The wing spar 62 is an aluminum tube extrusion, with dimensions of 3×2 inches with ¼ inch wall thickness, and is positioned between two more widely spaced jury spars 72. The wing spar 62 is fixed with respect to the wing extrusion 64 by a bolt 74 which passes through the wing spar 62 and attaches to the wing strut 56 by a bolt passing through an opening 75 formed in the wing strut. In a similar way jury struts 71 are connected to the wing struts 56 and in turn are connected to the wing spar 62 and further fix the wing extrusion 64 to the wing spar. The wing strut 56 is formed of a relatively thin aluminum bar which is bent so as to form a lower flange 76 with the bolt hole 78 through which the eye bolt 57 passes to attach the lower flange to the load strap 54. The wing struts 56 are also bent to form an upper flange 77 in which the bolt opening 75 is formed. Because the wings 60 are moved from a stored position to a deployed position by rotation of the wing spar 62 about the pivot shaft 66, the wing struts 56 must be free to rotate about the eye bolt attaching the strut to the fuselage 22, and to rotate about the bolt 74 which attaches the wing strut to the wing spar 62. This functionality is provided by using collar washers or simply low friction washers. As shown in FIG. 2, the wings 60 and the wing extensions 80 are formed from the same wing extrusion 64, and are supported on an extension spar 82. The extension spar 82 joined to the wing spar 62 by a friction fit connector 84 such as a wooden member which is friction fitted during assembly of the wings 60. The use of the wing extensions 80 allows the wings to be unassembled to fit within the cargo bay 44 of the fuselage which facilitates shipping by reducing the shipping volume of the logistics glider 20 when only partially assembled.

Figure 7:
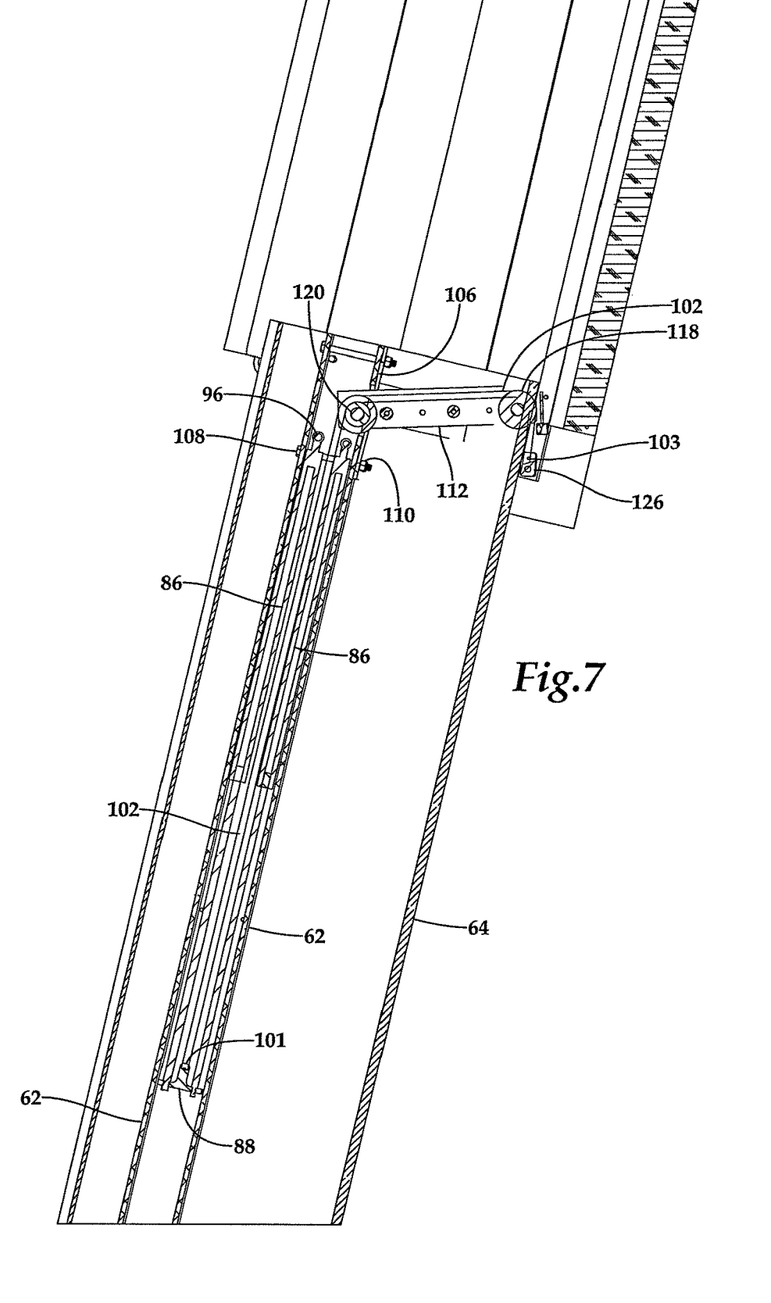
FIG. 7 is a top plan view of the fuselage bridging wing spar with the wing cutaway to show the wing deployment mechanism of FIG. 6.

The wings 60 are pivotally mounted for storage and for simplicity in deployment i.e. it would be difficult and limiting if the wings had to be deployed before the logistics glider 20 has departed from the aircraft from which they are being dropped. The wings are deployed by a mechanism and an energy storage system mounted internally to the wing spar 62. FIG. 2A is an enlargement of the deployment mechanism and energy storage system shown in FIG. 2. The basic mechanism consists of the spring which is compressed by a tension member when the wing is in a folded position. Energy in the spring is released as the tension member is allowed to feed into the wing spar by rotation of the wing about the pivot shaft 66. Referring now to FIGS. 2A, 6 and 7 the components of the deployment mechanism comprise two gas springs 86 which are joined together by a bracket 88 which has portions forming two openings 90 which receive the ends 92 of the pistons 94. Opposite ends of the gas springs 86 have threaded fasteners 96 which are mounted to openings 98 in the upper surface 100 of the wing spar 62 so that when assembled the gas springs 68 are completely contained within the rectangular aluminum extrusion forming the wing spar 62. The spring bracket 88 has a chain connection protruding from a face of the bracket pointing towards the gas springs 86 to which a first end 101 of a chain 102 is mounted. Still referring to FIG. 2A the wing spar 100 has a slotted opening 104 facing the aft direction when the wing is deployed. The spar is mounted to a pivot bracket 106 by attachment bolts 108 and nuts 110. A chain guide 112 comprised of a lower plate 114 and an upper plate 116 and a front sprocket 118 and a rear sprocket 120 spaced apart and mounted for rotation between the upper and lower plates 114, 116. The chain guide assembly 112 is mounted by screws 122 to threaded holes 124 in the pivot bracket 106. The second end 103 of the chain 102 is attached to an anchor block 126 as shown in FIG. 7. The wing spar 62 is attached to the pivot bracket 106 by the horizontal bolts 108 and a vertical bolt 128. The pivot bracket 106 and the chain guide 112 and the spar 62 are thus all rigidly attached and move together, so that when the wing is in the stored position overlying the fuselage, the chain guard 112 is parallel to the fuselage bridging spar 52 and perpendicular to the fuselage 22. When the wing is deployed the forward sprocket 118 is closely adjacent to the anchor block 126 when stowed forward sprocket is displaced forwardly towards the nose 28 and laterally towards the center of the fuselage 22. As the chain 102 does not change in length, the added path length must be made up by compressing the two gas pistons 94. The gas springs 68 have a combined spring constant of 150 pounds which opens the wings and holds them in the forward position eliminating the need for a latch hold open the deployed wings. With the lift to drag ratio of 16 and an overall weight of 2200 lbs. total drag is approximately 137.5 lbs. Assuming all the drag is caused by the wings, there is a force of about 62.5 lbs acting on each wing at the 44% cord along the length of the wing, such that turning movement about the pivot pin remains at all times substantially less than the 300 lbs. tension in the chain.

Figures 9A, 9B, 9C:
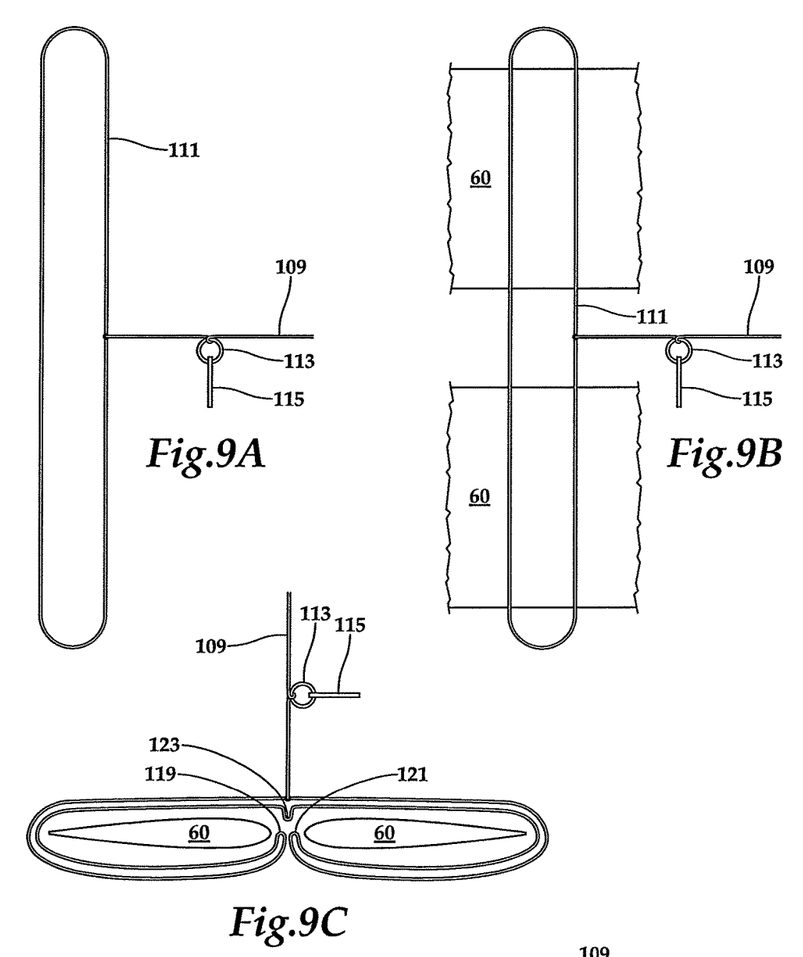
FIGS. 9A-D are a series of schematic views of the steps used to rig the logistic glider of FIG. 1 for deployment of the wings.
Figure 9D:
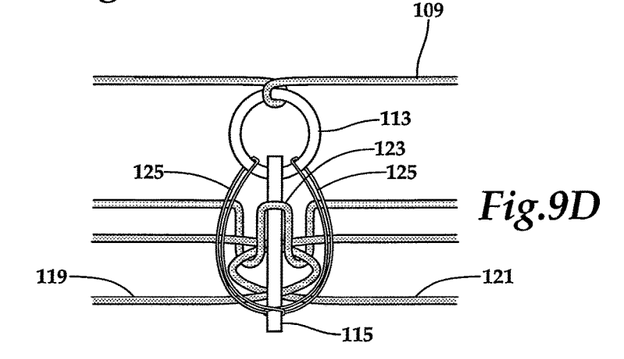

Referring to FIGS. 9A-D the wings 60 are rigged to a static line 109 which is tied to form a large loop 111 and knotted to a ring 113 holding an aluminum pin 115 as shown in FIG. 9A. The loop 111 is laid over the folded wings 60 as shown in FIG. 9B. As shown in FIG. 9C the large loop 111 is wrapped about both folded wings 60 forming a first loop end 119 and a second loop 121. A third loop 123 forms part of the large loop 111 opposite the pin 115. As illustrated in FIG. 9D the first loop 119 is overlapped with the second loop 121 and the third loop 123 is pulled through loops one and two. The pin 115 is then placed through the third loop 123. One or more rubber bands 125 attached to the ring 113 are stretched from the ring around the first, second and third loops and about the end of the pin 115 such that the pin passing through the third loop and between the third loop and the overlapping first and second loops such that all loops are constrained by the pin 115. The gas springs 86 through the wing 60 apply tension to the first, second and third loops which are restrained by the pin 115 until the glider is dropped. After the drop the static line comes under tension from the weight of the glider and pulls the pin 115 which releases the first, second and third loops which unwind freeing the wings 60 to pivot to their deployed positions. Finally the large loop 111 is then pulled away with the static line 109.

Referring again to FIG. 2, the plywood sides 50 as they extend aft are tapered and bent inwardly, which is facilitated by routing out a substantial portion of the plywood thickness in the region 128 which begins just aft of the aft bulkhead 46 the routed section allows the two sides 52 to meet at a point 130. Just forward of the meeting point is a slot 131 in the shape of the wing extrusion 80 such that a horizontal stabilizer 132 formed by a section of extrusion together with a horizontal stabilizer spar 134 can be fixed in the slot 131. Plywood doublers 138 as shown in FIG. 2 reinforce the slot 131. A framed upper panel 136 is held between the sides 50 between the aft frame 46 and the horizontal stabilizer 132. Thin metal channels 162 connect to the forward edge of the panels 138 as shown in FIG. 2 and support the aft end of the upper framed panel 136. Smaller upper doubled trapezoidal panels 138 are screwed to the portions of the side walls which extend over the horizontal stabilizer 132. The trapezoidal panels 138 have a slot for mounting a protrusion 139 of a vertical stabilizer 140 which can be attached with reinforcing metal plates as shown in FIG. 2. A port vertical stabilizer 142 is mounted to the horizontal stabilizer 132 by brackets as shown in FIG. 2 and to a rudder control surface 144 mounted to the port vertical stabilizer. To protect the rudder control surface 144 a metal channel 145 underlies the control surface, because when hoisted the glider 20 the tail 30 and more particularly the control surface 144 may be the last part of the glider 20 to leave the ground. A starboard stabilizer 146 is similarly mounted to the starboard side of the horizontal stabilizer 132. On either side of the central vertical stabilizer 140 left and right elevators 148 are mounted to the trailing edge of the horizontal stabilizer 132.

Figure 4:
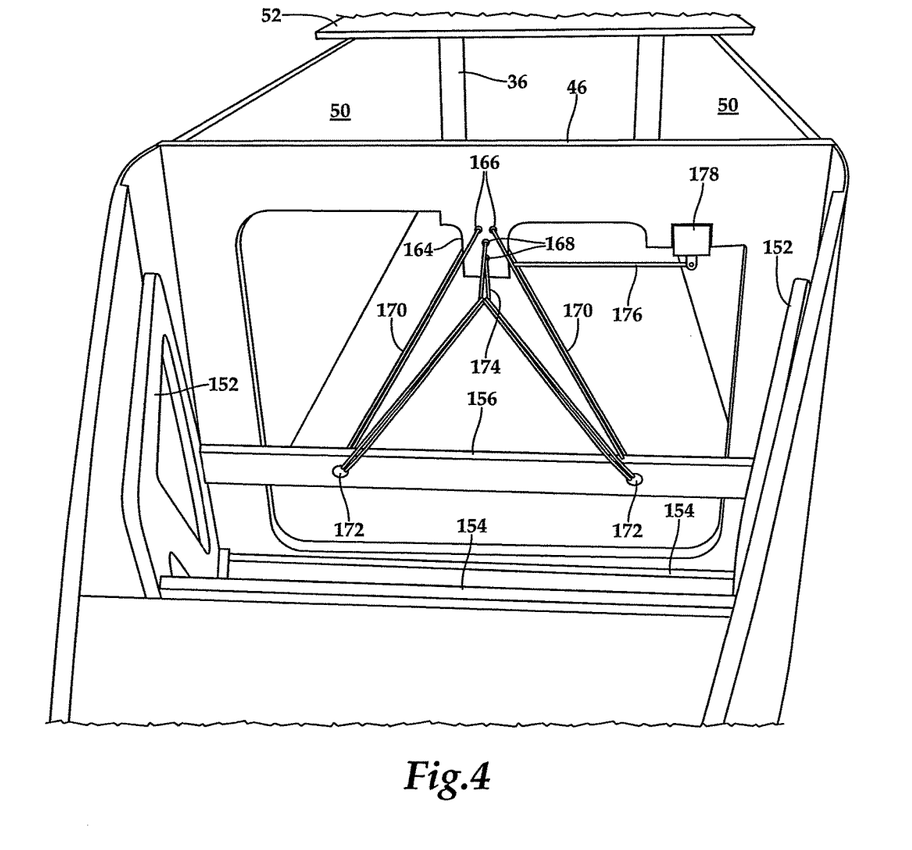
FIG. 4 is an illustrative perspective view of the parachute release mechanism positioned in the tail section aft of the cargo section of the logistic glider of FIG. 1.

On the underside or belly of the fuselage is mounted a lower frame panel 150 which has upwardly extending sides 152 which are connected by an aft cross member 154 as shown in FIGS. 3 and 4 and a forward cross member 156 which forms a downwardly rotatable drawer 158 which contains a parachute 160. Thin metal channels 161 are connected to the forward edge of the plywood of the upper doubter pane 1137 as shown in FIG. 2 and support the aft end of the lower framed panel 150. Referring now to FIG. 4, the aft frame 46 has an attachment protrusion 164 which has four holes, two upper holes 166 and two lower vertical holes 168. Through each hole 166, an attachment line loop 170 is threaded, the loops 170 also pass through holes 172 in the forward cross member 156 and are retained in a release loop 174 which is retained on the opposite side of the protrusion 164 by a release pin 176 which is pulled by a servo actuator 178. When the actuator 178 pulls the pin 176, one end of the release loop 174 is freed which allows the line loops 172 to pass through the holes 172 in the forward cross member 156 which allows the downwardly rotatable drawer 158 containing the parachute 160 to rotate, under the weight of the drawer and the parachute, downwardly while still supported for a time by the metal edge 162 thus bringing the forward edge of the drawer into the slip stream underneath the bottom panel 58 of the glider 20. The slip stream pulls the drawer 158 and the parachute 160 away from the glider 20 opening the parachute 160 through the action of a static line (not shown) attached to the aft frame 46. The force of the static line pulls the parachute 160 from the drawer 158, aerodynamic forces cause the drawer, which is still attached to the parachute canopy in such a way as to act as a drogue, to fully extract the parachute so that it rapidly inflates. Riser lines (not shown) connect the parachute to the tail of the glider 20 causing the glider to lose forward velocity so that the glider stalls and the glider begins a vertical descent under the parachute canopy.

The glider 20 has two landing modes, the first is a belly landing on the skid board 26, the second mode deploys the parachute after the glider makes a high-speed low approach to the drop point, then executes a maximum rate of climb pull up to approximately 500-1500 feet where the parachute is deployed. The first mode of a belly landing necessarily has somewhat higher reliability as all possibilities of parachute deployment failure are eliminated, and therefore, is used wherever terrain permits a controlled belly landing. Where the terrain is urban, mountainous or forested, the parachute landing mode will maximize payload delivery precision and success. The wings 60 which are not locked in the open position can be forced closed by the weight and the downwardly directed momentum of the glider and payload thereby reducing the likelihood the wings will impede the glider and payload from reaching the ground.

Figure 8:
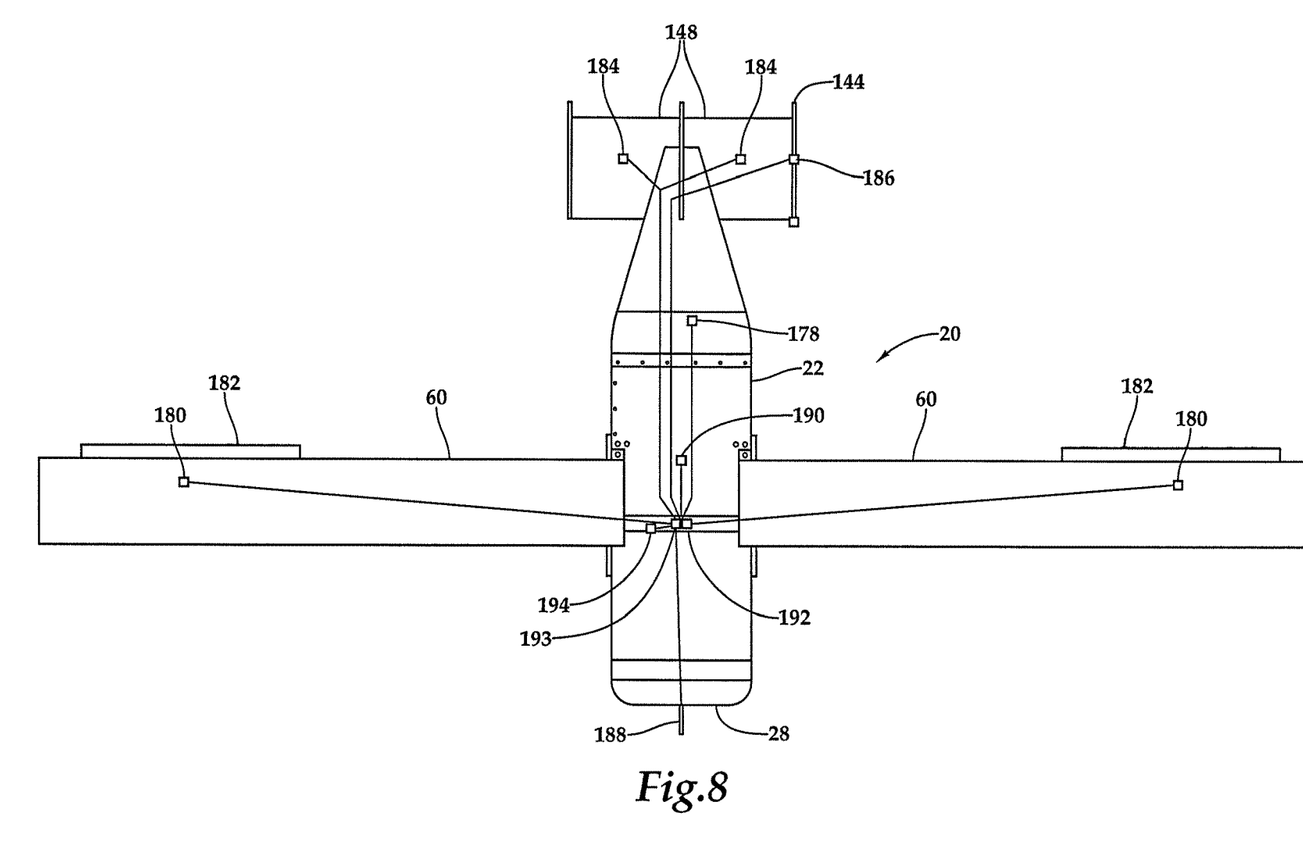
FIG. 8 is a schematic view of the logistic glider of FIG. 1 showing the instrumentation and control and actuators used to control the logistic glider of FIG. 1.

The glider avionics are shown schematically in FIG. 8. The glider 20 has six servo controls: two wing aileron servos 180 which control the wing flaps 182, two elevator servos 184 which control the left and right elevators, a rudder control servo 186, and a parachute release servo 178. The glider employs the following sensors and status indicators: a Pitot tube 188 which is used to measure air velocity; a GPS receiver and magnetometer 190 which provide three-dimensional positioning and heading information; an inertial measuring unit which can be used to augment GPS or when GPS is not available, to control the glider; flight controller CPU, status LED light 192, and an interface plug 193 which allows programming the CPU to control the flight path of the glider from launch to the logistics delivery point and provides for uploading the drop position and en route way points. Power is provided by a battery and solid-state power converter 194 which can provide approximately 15 watt-hours and the voltage necessary to drive the servos and to power the other electronics. The battery has an on-off switch which is switched on shortly before the glider is deployed on a cargo delivery mission.

The center of gravity (CG) of the glider 20 i.e., the point around which the resultant torque due to gravity forces vanishes, is located along the load strap 54 halfway between the wing struts attachment bolts 57. In order to maintain glider stability and maximize glider range the payload must be arranged in the payload bay so the CG location remains remain unchanged. This may be accomplished by placing a wheel on either side of the skid board 26 so that the glider is balanced with the axis of rotation of the wheels passing through the CG and underlying the load strap 54. The payload is then positioned within the payload bay such that the glider containing the payload remains balanced about the axis of rotation of the wheels and thus the center of gravity of the glider. Two wheels on a single axis, or a pair of helicopter wheels, which have one or two clamps such as screw clamps or over center clamps like a vise-grip can be used. The wheels, like helicopter wheels, which incorporate an over center mechanism to lift the glider and place the wheel axis under the CG for towing from the payload loading site to the launch aircraft may also be used. Because the glider is expendable the payload can be restrained in the payload bay by adding attach points by drilling holes in the sides 24 or the floor panel 48 or by attaching screw hooks or eyes is the sides or floor panel for the attachment of rigging lines.

It should be understood that the plywood panels and frames making up the glider fuselage could be joined by piano hinges for rapid assembly by military personal. One side of the piano hinge is pre-screwed to each side of each joint to be formed so that the joint can be completed by simply inserting a hinge pin.

It should be understood that the logistic glider 20 is relatively scalable within limits, for example, 250-5000 lbs. with a preferred payload between 500 and 2000 lbs. It is further understood that the payload can be increased by increasing wing span and/or wing attack angle, or the flight velocity.

It should be understood that the glider 20 may have more than one rudder and one or more vertical or horizontal stabilizers.

It is understood that the invention is not limited to the particular construction and arrangement of parts herein illustrated and described, but embraces all such modified forms thereof as come within the scope of the following claims.

We claim:

1. An expendable logistic glider comprising:
a fuselage having a nose and a tail, and a longitudinal axis extending therebetween, portions of the fuselage between the nose and the tail defining a cargo bay;
a fuselage bridging spar which is fixedly mounted to the fuselage;
a port wing spar pivotally mounted to the fuselage bridging spar, and a starboard wing spar pivotally mounted to the fuselage bridging spar, opposite the port wing spar;
wherein the port wing spar extending at least partly through a rigid airfoil to form a port wing;
wherein the starboard wing spar extending at least partly through a rigid airfoil to form a starboard wing;
a first source of stored energy mounted within the port wing to act on a first anchor attached to the fuselage to rotate the port wing from a first position at least partially over the fuselage to a second position perpendicular to the longitudinal axis of the fuselage;

a second source of stored energy mounted within the starboard wing to act on a second anchor attached to the fuselage to rotate the starboard wing from a first position at least partially over the fuselage to a second position perpendicular to the longitudinal axis of the fuselage.

2. The logistic glider of claim 1 wherein the first source of stored energy is a gas spring mounted within the port wing spar, the gas spring attached to a flexible member which is attached to the first anchor such that the gas spring is acted on by the flexible member to compress the gas spring when the port wing is in the first position at least partially over the fuselage, and the gas spring acts on the flexible member to pivot the port wing to the second position perpendicular to the longitudinal axis of the fuselage;

and wherein the second source of stored energy is a gas spring mounted within the starboard wing spar, the gas spring attached to a flexible member which is attached to the second anchor such that the gas spring is acted on by the flexible member to compress the gas spring when the starboard wing is in the first position at least partially over the fuselage, and the gas spring acts on the flexible member to pivot the starboard wing to the second position perpendicular to the longitudinal axis of the fuselage.

3. The logistic glider of claim 2 wherein the gas spring within the port wing spar is formed by two gas spring pistons having first ends connected to a bracket, wherein the flexible member is also connected to the bracket;

wherein two gas spring pistons having second ends connected to the port wing spar adjacent to portions of the port wing spar which forms an opening through the port wing spar;

a pivot bracket fixedly mounted to an exterior portion of the port wing spar adjacent to the opening through the port wing spar, the pivot bracket mounted to a pivot shaft which is mounted to the fuselage bridging spar to pivotally mount the port wing spar;

a flexible member guide mounted to the pivot bracket and extending away from the port wing spar;

wherein the flexible member extends through the opening through the port wing spar and outwardly from the port wing spar along the guide to the anchor, and wherein the flexible member guide and the pivot bracket form an arm which applies tension to the flexible member when the port wing is moved from the second position perpendicular to the longitudinal axis of the fuselage, to the first position at least partially over the fuselage so as to compress the two gas spring pistons.

4. The logistic glider of claim 2 wherein the rigid airfoils which form the port and starboard wings have a plastic extrusion having a plurality of jury spars connecting an upper and a lower surface which form the air foil.

5. An expendable logistic glider comprising:

a fuselage having a nose and a tail, and a longitudinal axis extending therebetween, portions of the fuselage between the nose and the tail defining a cargo bay;

two wing spars pivotally mounted to the fuselage on opposite sides of the fuselage;

wherein each wing spar extends through a rigid plastic extrusion having a plurality of jury spars connecting an upper and a lower surface which form a wing;

wherein each wing has a wing strut pivotally connected to the corresponding one of the wing spars, the wing strut pivotally connected to the fuselage spaced vertically from where the wing spar is mounted to the fuselage such that the wing strut pivots with the wing;

a first source of stored energy mounted within the port wing to act on a first anchor attached to the fuselage to rotate the port wing from a first position at least partially over the fuselage to a second position perpendicular to the longitudinal axis of the fuselage;

a second source of stored energy mounted within the starboard wing to act on a second anchor attached to the fuselage to rotate the starboard wing from a first position at least partially over the fuselage to a second position perpendicular to the longitudinal axis of the fuselage.

6. The logistic glider of claim 5 further comprising;

a spring mounted within each wing to act on an anchor attached to the fuselage to rotate the wing from a first position at least partially over the fuselage to a second position perpendicular to the longitudinal axis of the fuselage.

7. The logistic glider of claim 6 wherein the spring is a gas spring mounted within each wing spar, and the gas spring is attached to a flexible member which is attached to an anchor, such that the gas spring is acted on by the flexible member to compress the gas spring when the wing is in the first position at least partially over the fuselage, and the gas spring retracts the flexible member into the wing to pivot the wing to the second position perpendicular to the longitudinal axis of the fuselage.

8. The logistic glider of claim 7 wherein the gas spring within each wing spar is formed by two gas spring pistons having first ends connected to a bracket, wherein the flexible member is also connected to the bracket;

wherein two gas spring pistons having second ends connected to the wing spar adjacent to a portion of the port wing spar which forms an opening through the wing spar;

each wing spar having a pivot bracket fixedly mounted to an exterior portion of the wing spar adjacent to the opening through the wing spar, the pivot bracket mounted to a pivot which is mounted to the fuselage;

a flexible member guide mounted to the pivot bracket and extending away from the wing spar;

wherein the flexible member extends through the opening through the wing spar and outwardly from the wing spar along the guide to the anchor, and wherein the flexible member guide and the pivot bracket form an arm which applies tension to the flexible member when the wing is moved from the second position perpendicular to the longitudinal axis of the fuselage, to the first position at least partially over the fuselage so as to compress the two gas spring pistons.

* * * * *